(12) United States Patent
Albou

(10) Patent No.: US 6,776,513 B2
(45) Date of Patent: Aug. 17, 2004

(54) ELLIPTICAL HEADLAMP INCLUDING A SECONDARY OPTICAL SYSTEM

(75) Inventor: Pierre Albou, Bobigny Cedex (FR)

(73) Assignee: Valeo Vision, Bobigny Cedex (FR)

(*) Notice: Subject to any disclaimer, the term of this patent is extended or adjusted under 35 U.S.C. 154(b) by 0 days.

(21) Appl. No.: 10/255,057

(22) Filed: Sep. 24, 2002

(65) Prior Publication Data

US 2003/0072167 A1 Apr. 17, 2003

(30) Foreign Application Priority Data

Sep. 27, 2001 (FR) .............................................. 01 12560

(51) Int. Cl.[7] .................................................. B60Q 1/00
(52) U.S. Cl. .................... 362/507; 362/543; 362/544; 362/514; 362/517; 362/539; 362/545; 362/243; 362/247; 362/520; 362/521; 362/242; 362/245; 362/511; 362/538
(58) Field of Search ................................. 362/507, 514, 362/517, 539, 543, 544, 545, 243, 247, 511, 538, 520, 521, 242, 245

(56) References Cited

U.S. PATENT DOCUMENTS 4,517,630 A * 5/1985 Dieffenbach et al. ....... 362/509
4,894,585 A    1/1990 Segoshi ....................... 315/112
6,076,945 A * 6/2000 Matsubara et al. .......... 362/346
2001/0008486 A1    7/2001 Futani ......................... 362/512

FOREIGN PATENT DOCUMENTS

FR          2 777 064        4/1999

* cited by examiner

Primary Examiner—Stephen Husar
Assistant Examiner—Bertrand Zeade
(74) Attorney, Agent, or Firm—Morgan & Finnegan LLP

(57) ABSTRACT

The invention proposes a motor-vehicle headlamp (10), of the type including a main optical system (23) which comprises, arranged from back to front overall along a main optical axis (A—A), a main light source (16), a main reflector (14) of the elliptical type, and a converging main lens (18), characterised in that it includes a secondary optical system (36) comprising:

a secondary light source (48) which is arranged behind the main lens (18) and off the path of the light rays emitted by the main light source (16);

and an optical distribution element (42) which is interposed between the secondary light source (48) and the exit surface (19) of the main lens (18), in such a way as to form, at the exit from the main lens (18), a secondary regulatory beam for indicating.

8 Claims, 2 Drawing Sheets

ELLIPTICAL HEADLAMP INCLUDING A SECONDARY OPTICAL SYSTEM

FIELD OF THE INVENTION

The present invention relates to a motor-vehicle headlamp.

BACKGROUND OF THE INVENTION

The present invention relates more particularly to a motor-vehicle headlamp which is intended to produce at least one regulatory light beam, especially of the main-beam or of the dipped-beam type, of the type including a main optical system which comprises, arranged from rear to front overall along a main optical axis, a main light source, a main reflector of the elliptical type a first focus of which is situated in the vicinity of the source, and a converging main lens a focal plane of which passes close to a second focus of the main reflector.

In the motor-vehicle headlamps which include at least one main light source arranged within a reflector of generally parabolic shape or a reflector of the complex-surface type, it is known to arrange a secondary light source in a region of the reflecting wall of the reflector which is not essential to the forming of the regulatory light beam associated with the headlamp. This secondary source makes it possible to form a regulatory indicator beam of the position-light type.

According to the regulations in force, the position-light regulatory indicator beam, also called sidelight or sidelamp, has to shed light overall in all directions situated to the front of the headlamp with a relatively low luminous intensity compared to a main lighting beam such as a dipped beam or a main beam.

However, the arranging of a secondary light source in a reflecting wall of a main reflector cannot be envisaged for a headlamp equipped with a reflector of the elliptical type and with a lens.

This is because, since the main light source is arranged at the focus of the ellipse formed by the reflector, then the secondary light source absolutely must be arranged in a region which is very "defocused" and very much offset radially with respect to the main optical axis.

Consequently, the light beam produced by the secondary source at the exit from the lens is oriented mainly in a single direction very much inclined with respect to the optical axis. The luminous intensity is therefore not sufficient in the other directions, especially in the axial direction, to fulfil the regulatory requirements associated with a position-light beam.

Moreover, the headlamps with an elliptical reflector generally include a partial-shading device or mask, which is interposed axially between the reflector and the lens, with a view to shading some of the light rays emitted by the main light source so as to produce the corresponding regulatory light beam.

In the case of a headlamp forming a dipped beam, the mask is intended to shade mainly the light rays which would be directed upwards at the exit from the optical system. The mask is therefore arranged in front of the lower half of the outlet aperture of the elliptical reflector.

In this case, only the region of the reflecting wall of the elliptical reflector which is situated at the bottom, behind the mask, is not essential to implementing the main function and can therefore accommodate a secondary light source.

The light rays emitted by the secondary source then undergo the same shading effect as the main source. The light beam at the lens exit is therefore not correctly distributed in all directions, which does not allow it to satisfy the regulatory requirements.

Generally, when the main headlamps are of the elliptical-reflector type, it is then necessary to arrange the secondary light source outside the main headlamps, which is penalising especially in terms of costs and of bulk.

Moreover, the regulations of certain countries makes provision to oblige motor manufacturers to equip their vehicles with headlamps which produce a specific indicator beam, called "Day Running Light" or "daytime light", and which are intended to be lit permanently when driving by day.

Currently, this new indicating function requires a specific headlamp to be produced, dedicated to producing this regulatory daytime light beam.

There therefore exists a requirement for the design of a headlamp making it possible, in addition to at least one main function such as a dipped-beam function or main-beam function, to perform a secondary indicating function such as a position-light or daytime light function.

SUMMARY OF THE INVENTION

The invention aims to remedy the above-mentioned drawbacks, by proposing a headlamp of the elliptical type which is simple and economical, and which makes it possible to produce an indicator beam, in addition to at least one main lighting function such as a dipped beam or a main beam.

To that end, the invention proposes a motor-vehicle headlamp which is intended to produce at least one regulatory light beam, especially of the main-beam or dipped-beam type, of the type including a main optical system which comprises, arranged from back to front overall along a main optical axis, a main light source, a main reflector of the elliptical type a first focus of which is situated in the vicinity of the source, and a converging main lens a focal plane of which passes close to a second focus of the main reflector, characterised in that it includes a secondary optical system comprising:

a secondary light source which is arranged behind the main lens and off the path of the light rays emitted by the main light source;

and an optical distribution element which is interposed between the secondary light source and the exit surface of the main lens, which receives the light rays emitted by the secondary source on its entry surface and which distributes them over its exit surface, in such a way as to form, at the exit from the main lens, a secondary regulatory beam for indicating, especially of the position-light type or of the daytime-light type.

According to other characteristics of the invention:

the exit surface of the optical distribution element is adjacent to a portion of the entry surface of the main lens;

the optical distribution element is formed in a peripheral portion of the main lens;

the optical distribution element is a secondary lens;

the secondary light source and the optical distribution element are aligned generally along a secondary optical axis which is substantially parallel to the main optical axis;

the secondary optical system includes means designed to concentrate the light rays emitted by the secondary source onto the entry surface of the optical distribution element;

the secondary light source is arranged within a secondary reflector of generally parabolic or elliptical shape;

the structure of the secondary reflector is formed by moulding in a single piece with the structure of the main reflector.

BRIEF DESCRIPTION OF THE DRAWINGS

Other characteristics and advantages of the invention will become apparent on reading the detailed description which follows, for an understanding of which reference will be made to the attached drawings, among which.

DESCRIPTION OF THE PREFERRED EMBODIMENTS

First of all, it will be noted that, from one figure to the other, the elements which are identical or similar are referenced as far as possible by the same reference marks.

Figure 1:
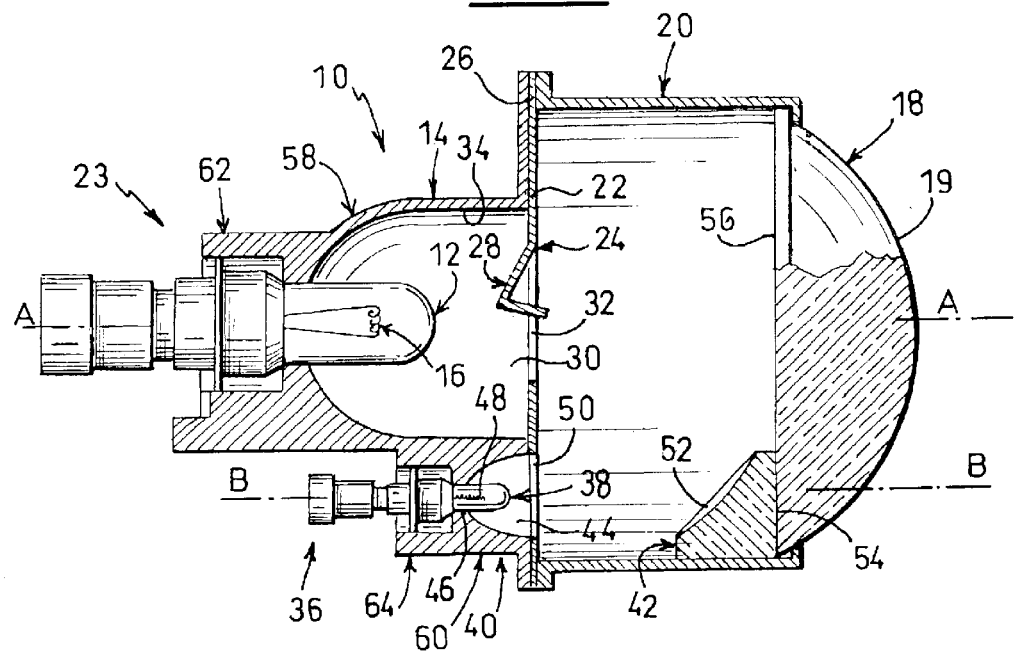
FIG. 1 is a view in axial section, which diagrammatically represents a main-beam headlamp of the elliptical type equipped with a secondary optical system in accordance with the teachings of the invention.

In FIG. 1, a headlamp 10 for a motor vehicle has been represented, which is produced in accordance with the teachings of the invention.

In a conventional way, the headlamp 10 includes a main light bulb 12 mounted in the back of a main reflector 14 of the elliptical type, in such a way that the filament 16 of the main light bulb 12 lies close to a first focus of the main reflector 14.

In the remainder of the description, an orientation from back to front will be used in a non-limiting way, along the main optical axis A—A of the headlamp 10, which corresponds to an orientation from left to right when considering FIG. 1. The main optical axis A—A is generally parallel to the longitudinal axis of the vehicle which the headlamp 10 equips.

The main optical axis A—A is substantially horizontal here, and it can be defined, for example, by the two foci of the main reflector 14.

An orientation from top to bottom will also be used, in a non-limiting way, along a vertical axis when considering FIG. 1.

The headlamp 10 includes a converging lens 18 which is mounted, at the front, in a framework element 20 of the headlamp 10 which is fixed onto a front transverse surface 22 of the main reflector 14.

The focal plane of the lens 18 passes close to the second focus of the main reflector 14.

The main light bulb 12, the main reflector 14 and the lens 18 together form a main optical system 23 the exit surface 19 of which is the front surface of the lens 18.

In the embodiment represented here, the main optical system 23 is intended to carry out a main-beam function, and, to that end, it includes a shading device, or mask 24, which is interposed axially between the front transverse surface 22 of the main reflector 14 and the rear transverse surface 26 of the framework element 20. The mask 24 is arranged substantially in the focal plane of the main lens 18.

The mask 24 is produced, for example, in accordance with the teachings contained in the French application No. 00.08903 filed on Jul. 7, 2000. Here it has the shape of a metal plate, oriented transversely overall with respect to the main optical axis A—A, which includes a shading part 28 in the upper half of the exit aperture 30 of the main reflector 14, and which delimits a window 32 in the lower half of the exit aperture 30 of the main reflector 14.

The mask 24 here aims to form an obstacle to the light rays emitted by the main light bulb 12 towards the upper part of the reflecting wall 34 of the main reflector 14, with a view to diminishing the luminous intensity emitted by the headlamp 10, in main-beam mode, in a region close to the front of the vehicle.

In accordance with the teachings of the invention, the headlamp 10 includes a secondary optical system 36 comprising a secondary light bulb 48, a secondary reflector 40 and an optical distribution element 42.

The secondary optical system 36 is intended here to perform a regulatory service of the position-light type. It is therefore necessary for the secondary light bulb 48 to produce a light beam at the exit from the main lens 18 which is spread out in all directions to the front of the vehicle, especially on the sides, downwards and upwards, as well as in the axis of the vehicle, as the regulations envisage.

The secondary optical system 36 here defines a secondary optical axis B—B which is substantially parallel to the main optical axis A—A and which is arranged here below the latter.

The secondary reflector 40 is adjacent to the lower part of the reflecting wall 34 of the main reflector 14. Here it has a generally parabolic shape. It includes, to the front, an exit aperture 44 and, to the rear, a hole 46 allowing fitting of the secondary light bulb 38, in such a way that its filament 48 is arranged generally at the focus of the parabola.

It will be noted that the mask 24 includes a window 50 facing the exit aperture 44 of the secondary reflector 40, so as to let through all the light rays emitted by the secondary light bulb 38.

Figure 2:
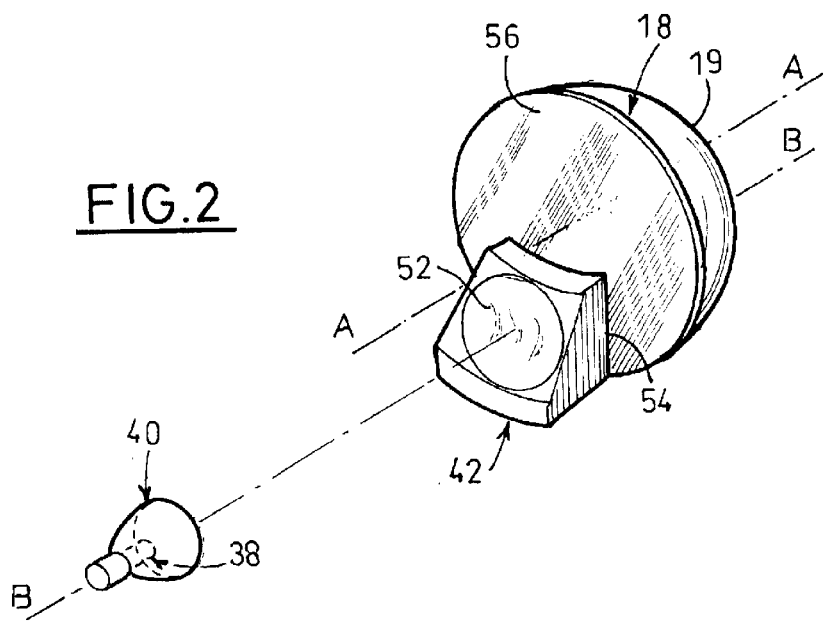
FIG. 2 is a view in perspective which diagrammatically represents the secondary optical system of FIG. 1.

In FIG. 2, the secondary reflector 40, the secondary light bulb 38, the optical distribution element 42, as well as the entry surface 56 of the main lens 18 have been represented diagrammatically in perspective.

The optical distribution element 42 here is a piece, made of glass for example, forming a converging secondary lens.

The secondary lens 42 therefore includes, at the rear, an entry surface 52 of overall concave hemispherical shape, which is inclined forwards and downwards, and, at the front, a flat exit surface 54 which is oriented transversely with respect to the secondary optical axis B—B.

Advantageously, the exit surface 54 of the secondary lens is adjacent to a peripheral portion of the rear entry surface 56 of the main lens 18.

It will be noted that, if the secondary lens 42 were not present, as the filament 48 of the secondary light bulb 48 is not arranged at the focus of the main lens 18, the major part of its light rays would be directed along directions substantially parallel to the secondary optical axis B—B over the peripheral portion face-to-face with the entry surface 56 of the main lens 18. The major part of these light rays would then be diverted upwards at the exit from the main lens 18, because of its convergence properties.

The secondary lens 42 therefore makes it possible to correct the angle of incidence of the light rays emitted by the secondary light bulb 38 onto the entry surface 56 of the main lens 18, in such a way that these light rays leave the main lens 18 while being distributed in all the directions to the front of the headlamp 10, which makes it possible to form the regulatory position-light beam.

In order to form the secondary lens 42, the conventional properties of the field of optics are used. It is possible, for example, to determine the optical characteristics of the secondary lens 42 which make it possible, at the exit from the main lens 18, to obtain light rays seeming to originate from the focus of the main lens 18, that is to say which make it possible to place the virtual image of the secondary filament 48 at the focus of the main lens 18.

Advantageously, the structure 58 of the secondary reflector 40 is formed by injection and moulding in a single piece with the structure 60 of the main reflector 14.

Structure 58, 60, here is intended to mean the body of each reflector 14, 40, as well as the means 62, 64 for support of each light bulb 12, 38.

The structure 58, 60 of the reflectors 14, 40 is produced, for example, by injection and moulding from metal, such as an alloy of magnesium or of aluminium. The reflecting surfaces of the reflectors 14, 40 are produced, for example, by depositing a layer of aluminium or of aluminium alloy.

As the main and secondary optical axes A—A and B—B are substantially parallel, the two light bulbs 12, 38 can be mounted in their respective reflectors 14, 40 according to the same principle, that is to say axially from rear to front, inside corresponding holes. This makes it possible to facilitate the operations of fitting and removal of the light bulbs 12, 38 in the headlamp 10, especially when changing the light bulbs 12, 38.

For preference, the headlamp 10 according to the invention is a main-beam headlamp, since the light beam from it is less demanding in terms of photometry, which makes it possible not to take account of the degradation of the light beam originating from the main light bulb 12 due to the presence of the secondary lens 42.

However, the headlamp 10 according to the invention can also be used to form a dipped beam, or to perform several different functions, in the case in which the headlamp 10 includes several movable masks 24, for example, which are associated with several different lighting functions.

Figure 3:
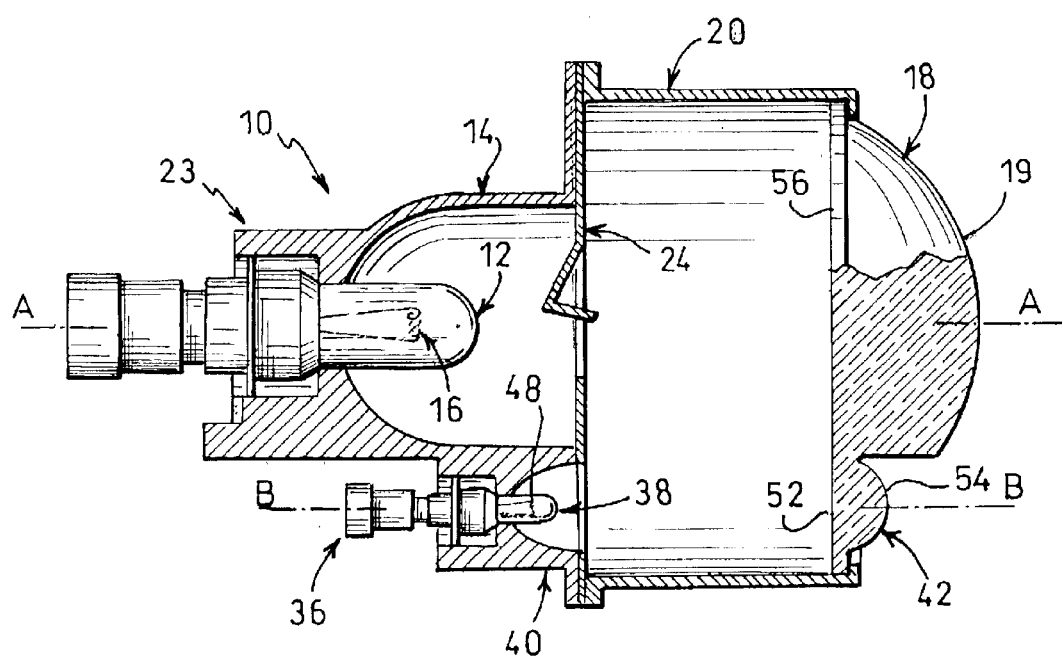
FIG. 3 is a view similar to that of FIG. 1 which represents a variant embodiment of the invention in which a secondary lens is formed in a portion of the main lens.

According to one embodiment variant, which is represented in FIG. 3, the secondary lens 32 is formed directly in the main lens 18.

As can be seen in this figure, a lower peripheral portion of the main lens 18 forms a secondary lens 42 which is arranged axially (B—B) face-to-face with the secondary light bulb 38.

Advantageously, the entry surface 52 of the secondary lens 42 is flat and it is situated in the same transverse plane as the entry surface of the main lens 18.

The exit surface 54 of the secondary lens 42 is of substantially hemispherical and convex shape here.

According to this embodiment, the secondary reflector 40 is preferably of the elliptical type, and it includes a first focus close to the secondary source 48 and a second focus close to the focal plane of the secondary lens 42.

The main lens 18 is currently produced by moulding. Consequently, in order to integrate the secondary lens 42 into the main lens 18, it is sufficient to modify the shape of the mould of the side with the exit surface.

Advantageously, the headlamp 10 according to the invention can be used in the context of a main light beam using infrared light. The document FR-A-2.756.237 describes an example of a headlamp capable of producing an infrared-light beam.

In fact, in this type of headlamp, it is sought to eliminate the "red leakages", that is to say the red-coloured light rays which leave the headlamp, despite the presence of a filter designed to let through only the infrared rays.

By virtue of the secondary light bulb 38, which shares its exit surface 19 of the headlamp 10 with the exit surface 19 of the main light bulb 12, it is possible to drown the red-coloured light rays originating from the main light bulb 12 with the substantially white-coloured light rays originating from the secondary light bulb 38.

Needless to say, the headlamp 10 according to the invention can be used in every case which requires an indicator beam, in particular to form a regulatory light beam for driving by day, or daytime light.

According to one embodiment variant, not represented, the optical distribution element 42 may be a mirror or a prism of appropriate shape.

In the embodiments described above, a secondary reflector 40 has been used to concentrate the light rays originating from the secondary light bulb 38 onto the entry surface 52 of the secondary lens 42. According to embodiment variants (not represented) of the invention, it is possible to use other means of concentrating the light rays, such as light guides, bundles of optical fibres, Fresnel-lens (or graded-lens) concentrating devices, etc, for example.

As Fresnel-lens concentrating device, it is possible to use a device such as a "cap" which is used in certain vehicle rear indicator lights to concentrate the light rays emitted by a light bulb without a reflector into parallel directions.

The cap generally includes a tubular fixing portion and a hemispherical portion which "envelops" the associated light bulb and which forms a Fresnel lens focused on the filament of the light bulb. The cap is generally produced from a plastic which can easily be tinted, which may be advantageous in the case of a main light beam using infrared light, with a view to eliminating the "red leakages" by the addition of slightly coloured light.

It will be noted that, when the main light bulb 12 is lit, it produces a substantial quantity of heat which is transmitted by convection, to a large extent to the upper part of the main reflector 14. However, for reasons of cost, the light bulbs 38 used to form the secondary source generally have plastic lamp bases which are sensitive to heat.

Consequently, the secondary reflector 40 and its light bulb 38 are preferably arranged below or beside the main reflector 14, so as to reduce the heating of the secondary light bulb 38 when the main light bulb 12 is lit.

What is claimed is:

1. A motor-vehicle headlamp which is intended to produce at least one regulatory light beam, of e type including a main optical system which comprises, arranged from back to front overall along a main optical axis, a main light source, a main reflector, and a converging main lens, the headlamp further comprising a secondary optical system comprising:

a secondary light source which is arranged behind the main lens and off a path of the light rays emitted by the main light source;

and an optical distribution element having an entry surface and an exit surface, said optical distribution element being interposed between the secondary light source and an exit surface of the main lens and being disposed to receive light rays emitted by the secondary source on its entry surface and which distributes them over its exit surface, in such a way as to form, at the exit from the main lens, a secondary regulatory beam.

2. A headlamp according to claim 1, wherein the exit surface of the optical distribution element is adjacent to a portion of the entry surface of the main lens.

3. A headlamp according to claim 1, wherein the optical distribution element is formed is a peripheral portion of the main lens.

4. A headlamp according to claim 1, wherein the optical distribution element is a secondary lens.

5. A headlamp according to claim 1, wherein the secondary light source and the optical distribution element are aligned generally along a secondary optical axis which is substantially parallel to the am optical axis.

6. A headlamp according to claim 1, wherein the secondary optical system includes means designed to concentrate the light rays emitted by the secondary source onto the entry surface of the optical distribution element.

7. A headlamp according to claim 1, wherein the secondary light source is arranged within a second reflector of generally parabolic or elliptical shape.

8. A headlamp according to claim 1, wherein the structure of the secondary reflector is formed by moulding in a single piece with the structure of the main reflector.

* * * * *